(12) United States Patent
Haag et al.

(10) Patent No.: US 6,580,974 B2
(45) Date of Patent: Jun. 17, 2003

(54) METHOD AND APPARATUS FOR MONITORING THE CONTROL OF OPERATIONAL SEQUENCES IN A VEHICLE

(75) Inventors: Wolfgang Haag, Winnenden (DE); Joerg Fischer, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/167,930

(22) Filed: Jun. 10, 2002

(65) Prior Publication Data

US 2002/0198638 A1 Dec. 26, 2002

(30) Foreign Application Priority Data

| Jun. 8, 2001 | (DE) | 101 27 833 |
| Feb. 13, 2002 | (DE) | 102 05 809 |

(51) Int. Cl.$^7$ ................................................ G06F 7/00
(52) U.S. Cl. ........................ 701/1; 701/36; 701/104
(58) Field of Search ............................. 701/1, 29, 31, 701/33, 34, 35, 36, 41, 51, 67, 70, 93, 99, 101, 104; 709/208; 180/197; 303/168, 173; 307/10.1

(56) References Cited

U.S. PATENT DOCUMENTS

| 5,120,982 A | * 6/1992 | Yopp et al. ................. 307/10.1 |
| 5,991,669 A | * 11/1999 | Dominke et al. ............... 701/1 |
| 6,154,688 A | * 11/2000 | Dominke et al. ............. 701/36 |
| 6,292,718 B2 | * 9/2001 | Staiger .......................... 701/1 |

FOREIGN PATENT DOCUMENTS

| DE | 41 11 499 | 11/1992 |
| DE | 41 14 999 | 11/1992 |
| DE | 44 38 714 | 5/1996 |
| DE | 195 00 188 | 7/1996 |
| DE | 198 26 131 | 12/1999 |

OTHER PUBLICATIONS

International Electrotechnical Commission (IEC) Draft Standard 1508, part 7, Appendix C.9.3 "Logical monitoring program sequence"**.

* cited by examiner

Primary Examiner—Richard M. Camby
(74) Attorney, Agent, or Firm—Kenyon & Kenyon

(57) ABSTRACT

A method and an apparatus for monitoring the control of operational sequences in a vehicle is described, in which context control functions are executed in a control unit, and monitoring functions that monitor the control functions are also executed. A monitoring module transfers at least one query to the control unit. A first monitoring function, in particular a sequence monitor, provided in the control unit, calculates a subresponse to the query in a second definable timing framework. The control unit creates, from at least one subresponse, a response to the monitoring module. Creation of the response is activated in a definable first timing framework. The control unit transfers the response to the monitoring module, and the monitoring module, as a function of the response, detects faults regarding execution of the control functions. The first and the second timing frameworks are asynchronous with one another.

16 Claims, 6 Drawing Sheets

METHOD AND APPARATUS FOR MONITORING THE CONTROL OF OPERATIONAL SEQUENCES IN A VEHICLE

FIELD OF THE INVENTION

The present invention generally relates to a method and an apparatus for monitoring the control of operational sequences in a vehicle, and more particularly relates to a method and an apparatus for monitoring the program sequence of safety-critical functions by redundant hardware.

BACKGROUND INFORMATION

In the context of safety-critical real-time applications of the control of operational sequences in a vehicle, it may be desirable for the underlying hardware to be monitored during operation. Complete discovery of all static and dynamic hardware faults may not be possible with acceptable effort, so that the software which implements the actual functioning of the operation is monitored along its safety-critical data flows and control flows. This may occur on the one hand via hardware-proximate monitoring and on the other hand by monitoring at the functional level.

Hardware-proximate monitoring may be accomplished by monitoring the processor using hardware-proximate testing and by the use of redundant hardware.

Monitoring at the functional level may be accomplished by monitoring those regions of the volatile memory (e.g. RAM) that represent the internal state of the function, and by monitoring those regions of the nonvolatile memory (e.g. ROM) that contain the actual program code of safety-critical functions (memory test). In addition to the aforesaid memory test of the volatile and nonvolatile memories, monitoring at the functional level may be accomplished by redundant execution of safety-critical functions, and by monitoring the correct program sequence of safety-critical functions using redundant hardware.

Only when all these items have been complied with may it be assumed that the software will be correctly executed on the processor during vehicle operation. Individual safety concepts related thereto may be discussed in Standard IEC1508, Draft Standard, part 7, Appendix C.9.3. "Logical monitoring of program sequence."

German Published Patent Document No. 198 26 131 discusses a program sequence monitor or program sequence monitoring system that may operate synchronously with a defined monitoring framework. On the basis of a test word or test datum (hereinafter called a "query") that is transferred from the redundant hardware, the program sequence monitoring system may calculate a subresponse which may be combined with the subresponse of the command test that monitors the processor in hardware-proximate fashion to yield a complete response to the redundant hardware. The response may then be checked by the redundant hardware (hereinafter called the "monitoring module"). In the event of a fault, the fault debounce system may be activated; after it has executed, a fault reaction may be triggered. Therefore, in the event of a correct subresponse, the program sequence monitoring system may ensure that individual subfunctions are all invoked at the stipulated frequency and are all terminated. However, a guarantee may not be provided that the functions are invoked in the correct order in terms of the control flow, i.e. their sequence with respect to the run time. Program execution may thus be only incompletely monitored by the processor.

The same is true of German Published Patent Document No. 41 11 499, which describes a control system for a vehicle having a microcomputer and a monitoring module that may be embodied as a gate array. The monitoring module may perform an execution check of the microcomputer; both of them process signal values in the context of a query-response interaction in a defined monitoring framework synchronously with the timing framework of the program sequence monitor, and by comparison of the results of that processing, the monitoring module may draw conclusions as to correct or faulty operation of the microcomputer.

German Published Patent Document No. 44 38 714 also describes a method and an apparatus for controlling a drive unit of a vehicle, in which for performance control, only one microcomputer may be provided for the execution of control functions and monitoring functions. At least two mutually independent planes may be defined in the microcomputer, a first plane executing the control functions and second plane executing the monitoring functions. An active watchdog that performs the sequence monitoring may be used as a query-response interaction.

In the disclosed safety concepts, communication between the monitoring module and the processor may be accomplished in a fixed timing framework synchronously with the program sequence monitor. This may mean that the existing methods and associated apparatuses may synchronize to a specific, defined monitoring framework. As a result, for example, it may not be possible for safety-critical functions that are activated at a point in time or in a timing framework (sequence of equidistant points in time) that is asynchronous with the monitoring framework to be incorporated into the program sequence monitoring system or program sequence monitor. In particular, sporadically activated safety-critical functions, in particular sporadic safety-relevant control functions, may not be monitored in this fashion. Thus, existing methods and associated apparatuses may not consistently yield complete, uninterrupted monitoring of the program sequence of the control functions.

Achieving continuous, complete, and uninterrupted monitoring of all safety-critical functions may be desirable.

SUMMARY OF THE INVENTION

In order to allow mutual time-related monitoring, according to the present invention, communication between the monitoring module and the processor may be based on independent time references. In addition, a method according to the present invention and an associated apparatus may be asynchronous with a defined monitoring framework or the timing framework of the program sequence monitor, thus permitting continuous, complete, uninterrupted time-related and functional monitoring of all safety-critical functions. Even sporadically activated safety-critical functions, in particular, may thus be monitored. In this context, a function is called "sporadic" if an upper and lower time limit for activation of the function may be indicated.

This may result in a method and an apparatus for monitoring the control of operational sequences in a vehicle, in which context control functions are executed in a control unit, and monitoring functions that monitor the control functions are also executed. The following steps may be performed: a monitoring module transfers at least one query to the control unit, a first monitoring function, in particular a sequence monitor, which in a second definable timing framework calculates a subresponse to the query, being provided in the control unit, the control unit creating, from at least one subresponse, a response to the monitoring module and creation of the response being activated in a definable first timing framework, the control unit transferring the response to the monitoring module, and the monitoring module, as a function of the response, detecting faults regarding execution of the control functions, and the first and the second timing frameworks being asynchronous with one another.

The result may be complete and continuous monitoring of safety-critical functions in the context of the asynchronous correlation, according to the present invention, between the monitoring framework and response creation. Defined fault latency times may be complied with via the asynchronicity between program sequence monitoring and response creation.

Because of the independence of the two timing frameworks, i.e. the asynchronicity of the method according to the present invention, represented by the order of the response creation activation times with respect to the monitoring framework or the program sequence monitor timing framework, response creation may be activated in a permanently predefined first timing framework, in which context the query may be transferred in event-controlled fashion, for example initiated by function calls or controlled by the end of a function processing action, or in a third timing framework that is independent of the first and/or second timing framework.

As a result, and because of the independence of the time references, the method and the apparatus may allow the incorporation of a quasi-random test word, as a query, into the calculation of the program sequence monitoring system's subresponse. As a result, a changing program sequence monitoring system subresponse may be generated, and actual processing of the monitored functions, in particular of the control functions, may be ensured. Without incorporation of a changing test word, i.e. a query, a processor fault that leaves the subresponse at a constant value may disable the program sequence monitoring system; this may be prevented by a method according to the present invention, by incorporation of the query and by looping through the fault state in which the incorrect subresponse is transferred as the initial value into the next subresponse calculation.

The control functions may be executed in a first functional plane of the control unit and the monitoring functions in a second and a third functional plane of the control unit, at least the first and the second functional planes being independent of one another as long as no faults are detected. Redundant data paths may be thereby made available.

At least one monitoring region may be created from the control functions of the first functional plane, in such a manner that selectable functions which form a sequence that is constant with respect to the run time of the control of the operational sequences are combined in the at least one monitoring region. Subresponses are created using the monitoring regions. The method may thus additionally monitor the monitoring regions in time-related fashion via their subresponse based on the test datum or query, since they may be activated at least once within the monitoring framework. In the event of a system overload, the subresponse therefore may not be created at the proper time, and the incorrect response resulting therefrom may be detected by the monitoring module as a fault or fault state.

The response may be created in the third functional plane from subresponses of different monitoring functions of the control unit. The corresponding monitoring functions which create individual subresponses may be contained in any functional planes.

According to the present invention, the correctness of the program sequence may thus be ensured in functional terms as follows: the frequency of function calls may be monitored; the order of the function calls as a sequence may be monitored; and correct execution of the function and/or functions, with correct starting and termination thereof, may be ensured.

DETAILED DESCRIPTION

Figure 1:
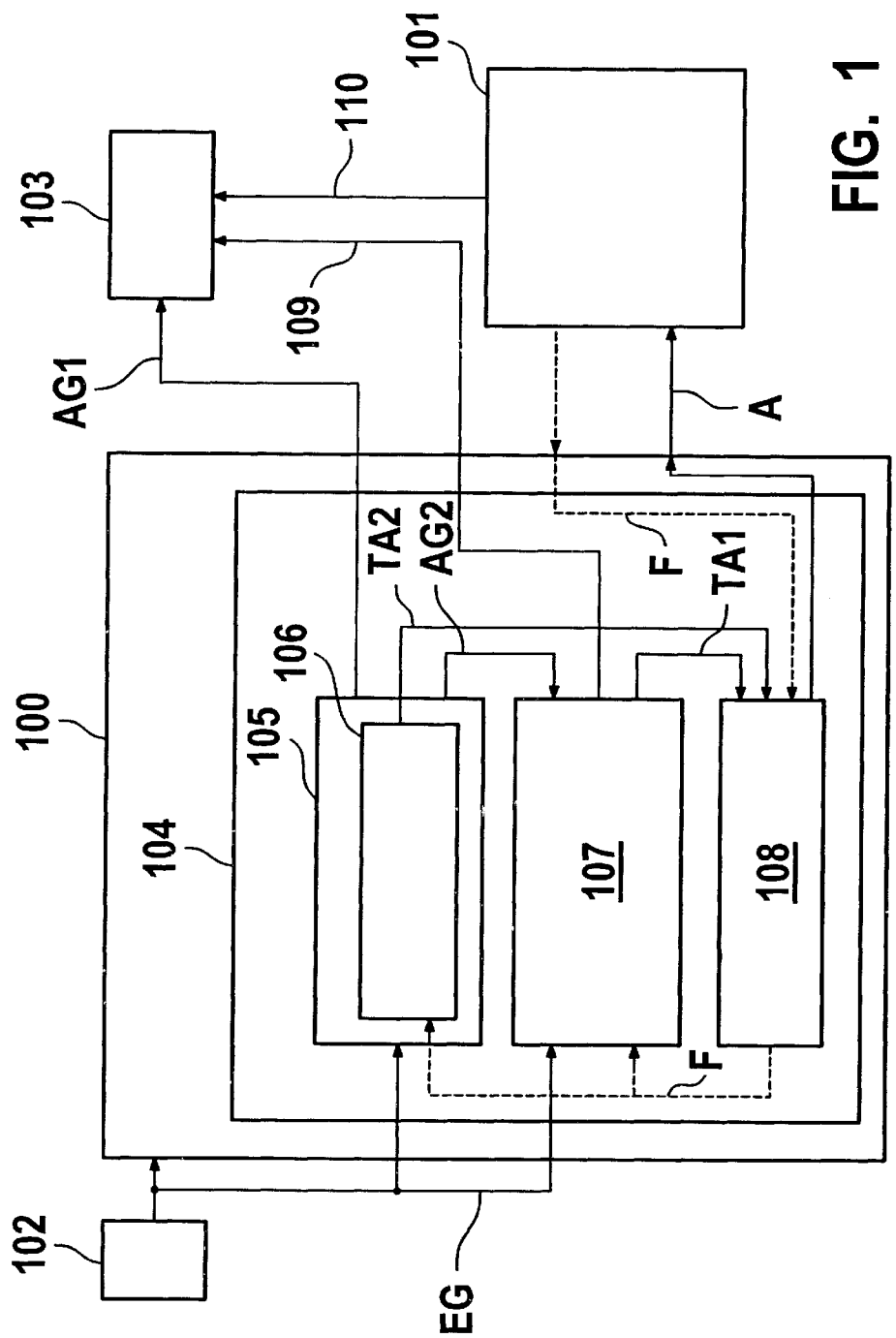
FIG. 1 shows a control unit with monitoring module for controlling operational sequences in a vehicle, and their interaction according to the present invention.

FIG. 1 shows a control system for controlling operating sequences in a vehicle, having a control unit 100 and a monitoring module 101. Control unit 100 may be, for example, a processor, microcomputer, or the like. The control unit 100 receives input data or input variables EG. For the sake of clarity, the source of the input variables is combined into one block 102. The input variables may derive from sensors, actuators, and further control units or the like in the context of the control of operating variables in a vehicle, and are conveyed to control unit 100, for example, via a bus system or also individual conductors.

Taking the example of control of an internal combustion engine, these input variables are, for example, input variables of a driver's input measurement device, that may be of a position sensing member for the position of an operating element actuable by the driver, e.g. an accelerator pedal, i.e. pedal setpoints. Further input variables are, for example, signals of a vehicle speed control system (FGR) or of an engine drag control system (MSR), as well as engine speed signals, etc.

The output signals of control unit 100, or output variables AG1, are then conveyed to actuators or output stages or further control units, etc. which for the sake of clarity are combined into one block 103 (as the input variables previously were into block 102). Linkage of these output stages or actuators, etc. may again be accomplished via individual conductors or also via a bus system, e.g. CAN (controller area network). A wireless linkage of individual input or output variables may also be provided.

In the context of control of a drive unit, these output variables AG (AG1 and/or AG2) may be, for example, signals for controlling an ignition time, signals for controlling an injection time, or signals for controlling fuel metering or also for controlling air delivery, for example, via an electrically actuable throttle valve, etc. The output variables may also be the air mass, for example represented by a signal of a hot film air mass sensor, or the ignition angle.

When a control system of this kind is used, for example, to control a braking system, signals of a vehicle speed control system and also signals of a driver's input measurement device are here again provided as input variables, for example with a position sensing member for the position of an operating element actuable by the driver, for example in this case a brake pedal. Input signals such as wheel rotation speed signals may also be provided in the context of a braking system. In the context of further control actions relevant thereto, these may also be rotation rate signals in the context of a vehicle dynamics control system (ESP), vehicle speed signals, or the like. The output variables in this context are positioning signals for actuators of the braking system, for example valves or a pressure medium conveying means such as a pump, etc. A control action of this kind may thus be present, for example, in an antilock braking system (ABS), and also in an automatic slip control system (ASR) or a vehicle dynamics control system (ESP), and also in another open- or closed-loop control action that influences the braking action and/or motion of the vehicle.

A control system of this kind may also be used in transmission control systems, a steering control system, e.g. steer-by-wire, etc., with correspondingly adapted input and output variables in each case. The conductors or signal paths 109 and 110 in FIG. 1 are optional, and represent "enable" signals of the monitoring module or the functional monitoring system to output stage block 103, i.e. a throttle valve output stage, etc.

It may be clear from the aforementioned examples that the control system depicted in FIG. 1 is a symbolically depicted general control system that may be used for the control of all operating sequences in conjunction with a vehicle. Control unit 100 contains control device software 104, which may differ depending on the application as described above. In general, however, the control device software contains three segments, called functional planes 105, 107, and 108, which, in interaction with the monitoring module, implement monitoring of the control of the operating sequences.

In order to make possible mutual time-related monitoring, the functionality in control unit 100 and in monitoring module 101 may be based on different independent time references. Various timers such as, for example, quartz oscillators, counter circuits, clocks, etc. may be used for this purpose as time references.

Since monitoring module 101 monitors the processor in terms of both time and function, the response creation function that creates the response to the monitoring module on the basis of query F (test word, test datum) or corresponding subresponses of various monitoring functions may be activated in a fixed, defined time framework. Only in the context of a deliberate plausibility check of the response framework may any deviation in procedure arise.

The test word, test datum, or query F itself may be, for example, a 4-bit wide data word that is transferred to control unit 100 (also called the "function computer"). Monitoring module 101 quasi-randomly generates as queries, for example, a specific number of different test words, for example 16 of them. If calculation occurs in control unit 100 at, for example, a bit width of 32 bits, then with a 4-bit width for each data word ($2^4=16$), only 16 test words or 16 associated responses out of $2^{32}$ possibilities are valid.

On the basis of the query, different monitoring functions, in particular program sequence monitor PAK, create different subresponses. Creation of these subresponses may be accomplished either in a single monitoring framework or in different time frameworks.

According to the present invention, however, no time-related coupling exists between query/response communication and the time frameworks or time framework of the monitoring functions, especially program sequence monitor PAK. The result of this may be that the method according to the present invention, and thus activation of the response creation function, is performed asynchronously with the corresponding monitoring time framework.

Control device software 104 containing the monitoring functions is, as mentioned, constructed in three functional planes. Functional plane 1 (block 105) includes the control functions, functional plane 2 (block 107) the monitoring functions or so-called function monitoring system, and functional plane 3 (block 108) the response creation function for transmitting response A to monitoring module 101. According to the present invention, the monitoring functions may be localized not only in functional plane 2 but also in functional plane 3. In the context of the function monitoring system, no distinction is made, with regard to the functions or program segments to be monitored, between control functions and hardware monitoring functions, such as component monitoring functions or the like. These functions are, so to speak, primary functions for controlling the operating sequences of the vehicle, and are hereinafter subsumed under the term "control functions." The secondary functions that serve for monitoring and control of these primary functions or program segments are the actual monitoring functions in connection with the present invention.

In the example of controlling an internal combustion engine, functional plane 1 contains, for example, all the engine control functions as well as component monitoring e.g. for the throttle valve sensor apparatus, for the throttle valve drive system, for the pedal travel sensor apparatus, and also, for example, component monitoring functions for the sensor apparatus for sensing the speed signal or with regard to the brakes. Taking the example of a drive control system, signals from the rest of the drivetrain, for example regarding speed and brakes, may also be made available via a bus system, e.g. CAN, in functional plane 1. In this example, functional plane 1 also contains substitute functions for component failure.

Functional plane 2 (block 107) encompasses, for example, detection of the driver's input, in particular via an independent path (separate RAM or ROM region). Protection of the ROM in the defined region is accomplished separately, to ensure that the program code between the initial and final processing of program modules or program segments or functions is correct. The query/response communication program segment need not be located in the memory region, especially the ROM region, that is to be protected, since faulty or no execution may result in an incorrect response that is detected by the separate monitoring module constituting redundant hardware. Functional plane 2 also encompasses calculation of the true engine torque from engine variables, for example by observers in the context of the control strategy, as well as continuous plausibilization of the driver's input and true engine torque, also the shutoff path for the throttle valve output stage (DK zero-current) and the SKA request. Functional plane 2 may also contain sequence-controlled program modules which calculate subresults, i.e. subresponses for query/response communication; these modules may also be contained in functional plane 3 (block 108).

In addition, the aforementioned functional plane 3, in block 108, contains the self-monitoring system of function computer 100, for example the memory test for the volatile and nonvolatile memory regions, i.e. RAM and ROM as described above, the command test, the ADC test, and the program sequence controller at least for the program modules of plane 2 (optionally, incorporation of the monitoring regions from functional plane 1 into the program sequence monitor). Also functionally associated with functional plane 3 is the hardware monitoring module, although the latter is provided as redundant, separate hardware, as a result of which query/response communication with random queries, the memory test for the RAM and ROM regions, and an independent shutoff path test as part of the monitoring module may in this case be functionally included therein. Also provided in functional plane 3 is mutual monitoring of the function computer and monitoring module in the time and value range, in which context, if a fault is identified in the sequence monitor in functional plane 3, the following fault reactions may be performed: if there is no response or an incorrect response, after fault debouncing a fault reaction occurs which reliably prevents any torque generation by the motor, e.g. shutoff of the torque-determining output stages (e.g. injection valves, ignition, throttle valves) via redundant hardware (monitoring module). Other fault strategies may be provided in this context.

In a specific example embodiment, monitoring regions or at least one monitoring region are/is formed in block 105, i.e. functional plane 1. Specific safety-critical functions or control functions and/or subregions of the functional software that are also to be incorporated into the response or are used in creating the response (block 106) are regarded as a monitoring region. A monitoring region of plane 1 may thus include, for example, component monitoring functions for pedal value transducer PWG or the throttle valve sensor apparatus. The monitoring region or regions is/are then also incorporated into program sequence monitor PAK, and supply subresponses for overall response creation in functional plane 3. The monitoring region for the functional software (block 106), i.e. for the control functions or safety-critical functions in functional plane 1, that is incorporated into the program sequence monitor calculates, on the basis of the query, a subresponse that is incorporated into creation of the final response to the monitoring module. This relationship is depicted in FIG. 1 with subresponse TA2. As already mentioned, the monitoring region is assembled from safety-critical functions that are not sufficiently incorporated by pure function monitoring.

The function monitoring system in functional plane 2 (block 107) is a software-diverse algorithm that monitors the functional software in functional plane 1 on the basis of the input and output data thereof. The functionality, or the monitoring functions that are used, govern whether the same output data AG1 that are also conveyed to the output stages or actuators are transferred into the function monitoring system, or whether output variables AG2 differing therefrom are incorporated into the function monitoring system. According to the present invention, both may be possible. The function monitoring system in functional plane 2 (block 107) is also incorporated into the program sequence monitor of functional plane 3.

Figure 2:
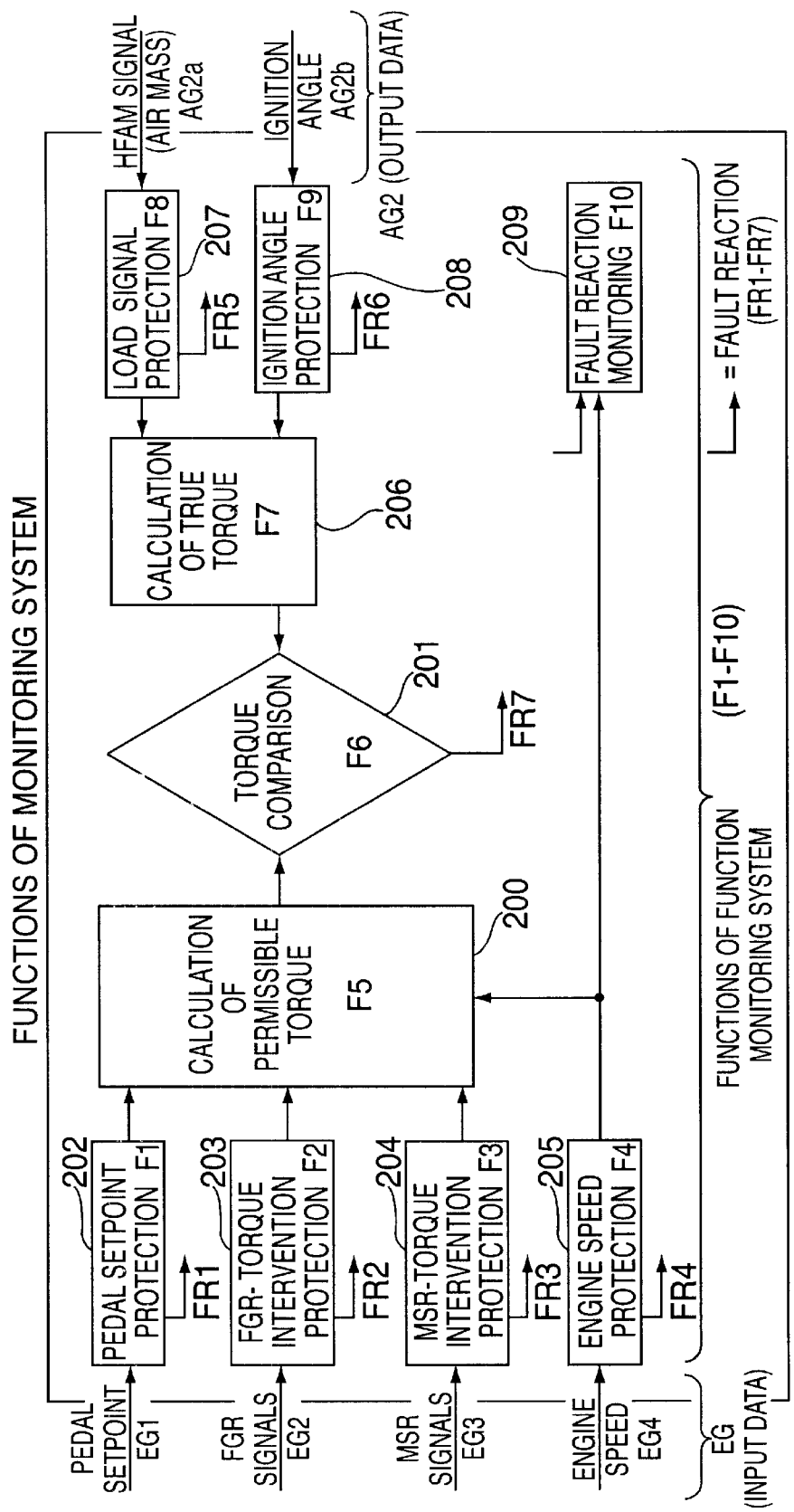
FIG. 2 shows functional monitoring in an example of control of a drive system in the context of the present invention.

FIG. 2 shows the function monitoring system, once again on the basis of an example embodiment. The input variables used here, via an example, are pedal setpoints EG1, FGR (vehicle speed control system) signals EG2, MSR (engine drag control system) values EG3, and the engine speed as EG4. In block 202, protection or monitoring of the pedal setpoint is accomplished as function F1; in block 203, protection or monitoring of the FGR torque intervention is performed as function F2; and in block 204, protection or monitoring of the MSR torque intervention is performed as function F3. The engine speed is protected or monitored in block 205 as function F4. From the data of blocks 202 through 205, the permissible torque is then calculated in a function F5 in block 200. Output data or output variables are also transferred to the function monitoring system by the control functions for the functional software. These output variables AG2 are, for example, the air mass in the form of a hot film air mass sensor signal as AG2a, and the ignition angle as AG2b. The load signal is thus protected or monitored in block 207 as function F8, and the ignition angle is protected or monitored in block 208 as function F9.

From the output variables of blocks 207 and 208, the true torque is then calculated in a function F7 in block 206. The variables from blocks 200 and 206, the torques calculated by functions F5 and F7, are then juxtaposed in a torque comparison in a function F6 in block 201. In this example of an internal combustion engine control process, the functions of the function monitoring system are depicted as F1 through F10, F10 being a fault reaction monitoring function that is disclosed in block 209. Incorporated into this are the fault reactions of the individual functions FR1 through FR7 and the engine speed monitoring value.

The function monitoring system based on the input and output data is accomplished, for example, in a monitoring cycle T4, e.g. 40 ms. After this time T4, all the monitoring functions, e.g. F10, F20, and F40, are executed at least once in a defined sequence. This cycle may then also contain monitoring functions with different time frameworks, e.g. a function F10 in a time framework T1, e.g. 10 ms, a function F20 in a time framework T2, e.g. 20 ms, a function F40 in a time framework T4, for example 40 ms. The result is a cyclical defined sequence referred to time framework T4, e.g. 40 ms. In our example this may be, for example, F10 (corresponding to the first 10-ms framework), F10, F20 (corresponding to the second 10-ms framework), F10 (corresponding to the third 10-ms framework), and F10, F20, F40 (corresponding to the fourth 10-ms framework).

Determination of the monitoring regions are now explained in more detail. Monitoring of the program sequence of safety-critical program segments and/or functions is intended to occur continuously. The safety-critical program segments and/or functions and their activation frameworks or activation times may be defined, for example, in a system request. These may thus be time-related frameworks or also event-controlled times.

If it is possible to define for a program segment a control flow that is fixed both dynamically and in time with respect to the run time, the functions may then be combined into a monitoring region. The control flow between, for example, two functions F1 and F2 is considered fixed if a sequence that is constant with respect to the run time may be indicated, for example F1, F2; F1, F1, F2, or F1, F2, F1, F1, F2, etc. The time-related monitoring region is defined by the time period between activation of the first function of the sequence and termination of the last function of the sequence. If, however, the control flow between the monitored functions changes with respect to the run time, i.e. if, for example, F1, F2 or F2, F1 applies to two program segments at one time, then the functions or sequences may be distributed to different monitoring regions. The redundant hardware may then create a subresponse to the input datum for each monitoring region. The subresponses of all the monitoring regions may be combined with the subresponse of the hardware-proximate processor test, for example via an XOR command. Thus, for example, at least one subresponse TA1 is transmitted from the function monitoring system, or additionally TA2 from the monitoring region for the functional software (block 106), to the response creation function.

In order to monitor the processor over time, response creation itself is activated in a fixed defined framework. In order to make possible a program sequence monitor or program sequence monitoring system PAK that is maximally dependent on the query, the query (i.e. the test datum or test word) is incorporated into the response creation process at the end of the monitoring of a monitoring region. The resulting subresponse (TA1 or TA2) is incorporated into the response creation process in block 108.

Figure 3:
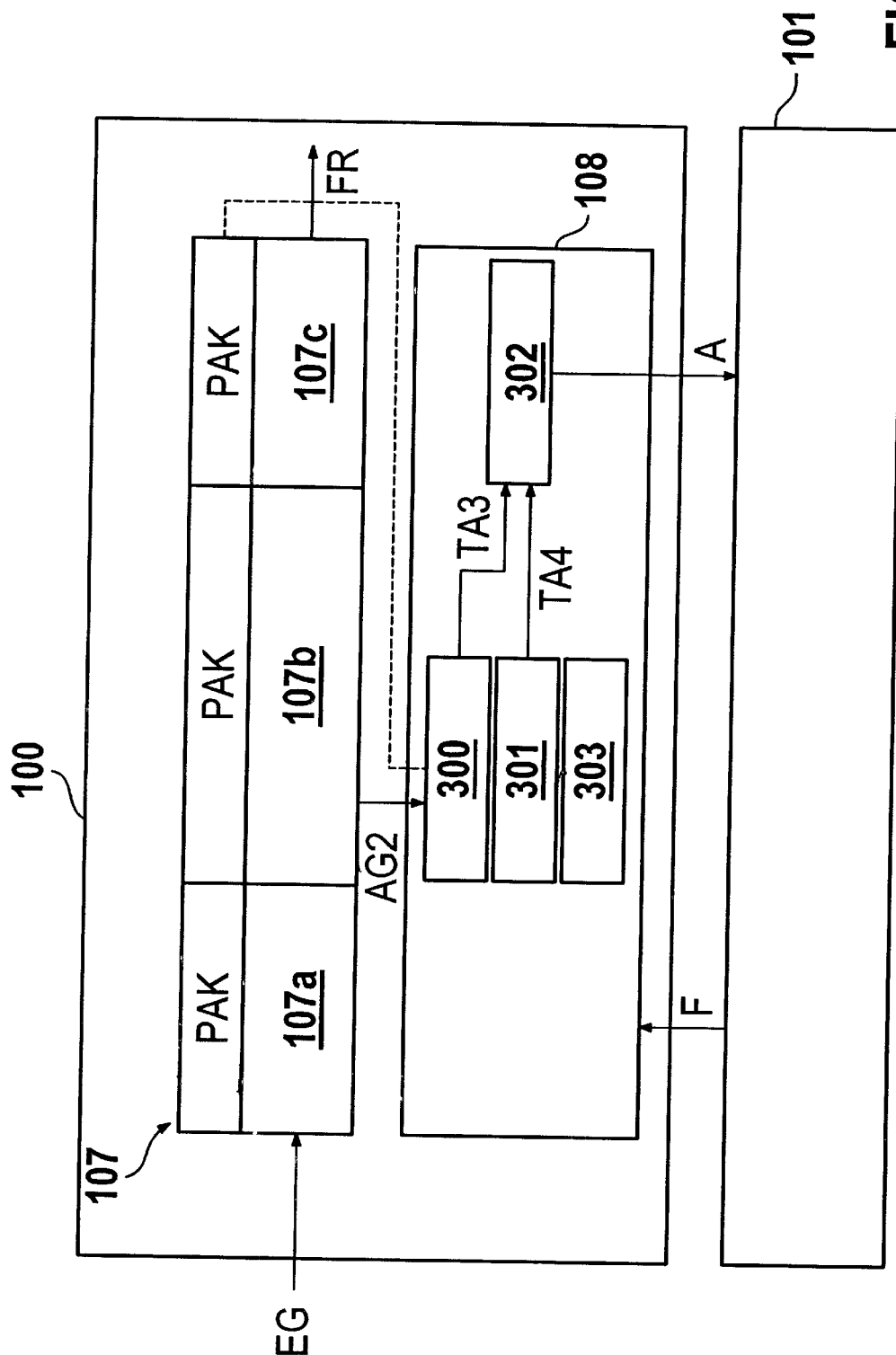
FIG. 3 shows response creation based on subresponses from the program sequence monitor and command test.

Response creation from subresponses is explained again in more detail in FIG. 3, in which 100 once again symbolically depicts the control unit, and 101 the monitoring module. Monitoring module 101 transfers a query F to the function computer or control unit 100. This test word, constituting the query, may then be employed in the various functional planes and/or monitoring regions for subresponse creation.

Functional plane 2, depicted in the example as block 107, once again receives input variables EG. These are first conveyed to a block 107a (input signal transfer) and then transferred to the actual function monitoring system in block 107b. Block 107c then couples the fault reaction output to fault reactions FR. These blocks 107a through 107c then correspond to function monitoring with respect to functions F1, F2, etc. Each module 107a through 107c is incorporated into program sequence monitor PAK. In this example, this program sequence monitor is located in block 300 in functional plane 3 (block 108), as depicted by the dashed line. A subresponse TA3 is thus created in this program sequence monitor PAK in block 300. A subresponse TA4 is also created in block 301. Block 301 corresponds, for example, to the command test already mentioned, in which query-specific test data are used to prepare a response contribution TA4 for response creation. The aforementioned memory test is present, for example, as a further block 303 in functional plane 3. From subresponses TA3 and TA4 coming into block 302, the overall response A for the monitoring module is then created therein; as already mentioned, for time-related monitoring reasons, activation of the response creation process is accomplished in a time framework asynchronously with the monitoring framework.

There is thus no time-related coupling between query/response communication and program sequence monitor PAK. The program modules of the program sequence monitor are processed cyclically according to a fixed order in a specific defined time framework, e.g. 10 ms. After 40 ms, for example, a PAK cycle is terminated and all the program modules of the program sequence monitor have been run through at least once. If query/response communication is also processed in a fixed time framework, e.g. also 10 ms, a state control system then ensures asynchronicity according to the present invention. The program module for query/response communication thus contains a state control system for monitoring the monitoring module via different output times, e.g. too early, too late. The output time or transfer time begins a new monitoring cycle of the monitoring module, with which the query/response communication process must resynchronize itself in each case in order to hit the fixed time window. The query/response input/output time thus floats relative to the time framework of program sequence monitor PAK.

The PAK program modules are processed in sequence. In each program module, a beginning operation and an ending operation are performed, thereby monitoring one complete module or function sequence. In the beginning operation, a test word is created. This test word is made up of a module call counter, which senses the number of module calls in each PAK cycle (e.g. 40 ms), and a module-specific constant. The test word format has, for example, a data width of 32 bits; for example, bits 31-27 correspond to the module call counter for each PAK cycle, and bits 26-0 correspond to the module-specific constant. In the ending operation, a check sum calculation is performed using the test word created in the beginning operation. This check sum calculation is performed, for example, using the multiple input signature register (MISR) check sum method. After the entire PAK cycle has executed, a CRC checksum is then written, as the result, into a register, in particular into the signature register.

If no new query has arrived during the PAK cycle, a further constant, which is defined so that the result corresponds to the initial value if execution has been fault-free, is added to this checksum using the MISR method. This result is used to sum the next PAK cycle using the MISR method. If the program sequence is faulty, the result does not correspond to the initial value, so that even if subsequent program sequences are correct, the fault is looped through and is incorporated into the next response calculation.

If a new query does arrive during the PAK cycle, the MISR method is used to sum the query (rather than the constant), and the result is stored as a subresponse, for example in a register (the subresponse register). At the same time, the aforementioned signature register is reset to the initial value and the query is reset, and execution continues with the next PAK cycle. A query-specific result is thus obtained in the PAK subresponse. In block 203 of the response creation function the subresponse of PAK TA3, for example together with the subresponse of the command test TA4, is conveyed to a response decoder, which creates therefrom response A for monitoring module 101. The correct response (if the subresponses from PAK 300 and command test 301 are correct), and otherwise the response recognizable as incorrect, is prepared and is then transferred.

Figure 4:
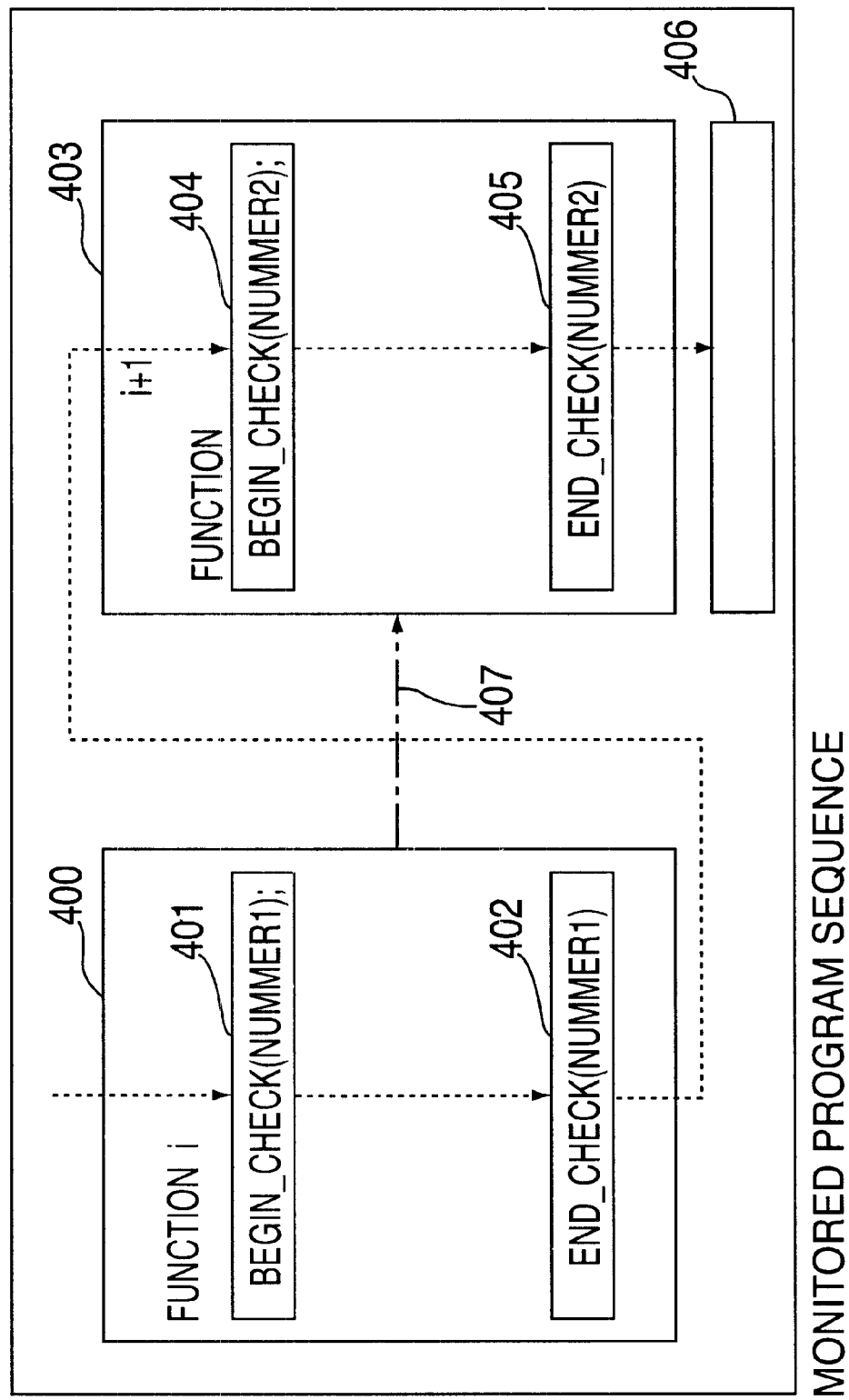
FIG. 4 shows the program sequence that is monitored according to the present invention.

With the asynchronous coupling and differing time frameworks for query/response communication and PAK that are present here, a continuous, complete monitoring of the program sequence or functions is achieved via the method explained once again in FIG. 4. Sequence monitor PAK may ensure, in this context, that important safety-critical program segments and/or functions are executed cyclically in a defined time framework and in a defined order. This may ensure that the method also detects transpositions, replacement of one program code segment due to multiple execution of another one, double execution of program code segments, and jumps between program code segments. This may be achieved by the feature that each program module or safety-critical program code segment and/or each safety-critical function possesses a test point at the beginning and the end.

In order to account for all instances with respect to the various time frameworks, fast and slow frameworks may be different in terms of activation of the functions, in particular, of a monitoring region.

The monitoring region is thus activated with respect to the response creation function in a faster or in the same time framework, thus ensuring that a response may be created in each monitoring cycle. The same may be true in the context of event-controlled querying, provided the query is present at the right time in the context of the monitoring framework. In this case, i.e. a faster or the same time framework, activation of the monitoring region, or a subresponse resulting therefrom, is incorporated into the response creation process. This incorporation into response creation may ensure time-related monitoring of the monitoring region. In the event of a system overload, the subresponse is no longer created at the proper time. The resulting incorrect response is detected by the monitoring module. This may ensure that the monitoring region has been activated at least once within an activation of the response creation process in the monitoring time framework. This kind of simplified deadline monitoring may be sufficient for a very large number of safety-critical applications.

If the monitoring region is activated in a time framework that is slower compared to response creation, or if the query arrives too late to be incorporated into a response creation action, a current subresponse relative thereto may not be taken into account in each monitoring cycle. In this case the time period for response creation is d-response and the time period for calculation of the monitoring region is d-region, where d-region >d-response.

Creation of a subresponse may thus be possible within the time period n*d-response (where n*d-reponse>2*d-region).

The last valid subresponse may thus be utilized in the response creation monitoring cycles in which no subresponse is present. The procedure nevertheless may ensure that a subresponse is present after n cycles. The subresponse is then also incorporated into the monitoring process. If a monitoring region is activated sporadically, its upper time limit is then applicable for designing the synchronization with response creation. This case as well is thus mapped onto the cases cited above.

The numbers in FIG. 4 represent the respective functions or the respective program module. If a 32-bit test word is selected, for example, they fall in the range from 0 to 26. No correlation need exist between the number assignment and the sequential relationship of the functions. The sequential relationship may be ensured via a check sum algorithm (e.g. MISR) that is explained later and has already been cited above via example. Each function, however, has a unique number assigned to it.

FIG. 4 depicts the sequence for function i in block 400 and for function i+1 in block 403. The algorithm is implemented as follows: the test word format or test word is made up of a counter for the current number of activations (module call counter, top m bits) and a status word (module-specific constant, bottom k bits). The status word represents, via the particular bit position, the current transferred number of the function. The test word thus contains m+k bits.

In the begin_check function, the bit position of the status word corresponding to the number is set in a buffer register and the number of activations is incremented (illustrated here in block 401 for function i and in block 404 for function i+1). The end_check function in block 402 and block 405 once again sets the bit position of the status word corresponding to the number in the buffer register. On the basis of the current check sum and the contents of the buffer register, the new check sum is calculated on the basis of the check sum algorithm. The finish_check in block 406 links the current check sum to the correction value or, for monitoring in the fast time framework, to the test word of the monitoring module.

In the check sum method already mentioned, a sequence of test words (TW1 through TW4) is conceptually divided by a generator polynomial:

TW1 TW2 TW3 TW4 0: generator polynomial= remainder

When the remainder is incorporated into the calculation, the result is then:

TW1 TW2 TW3 TW4 remainder: generator polynomial= 0.

Transposed or skipped code words are detected by this method in the context of the aforementioned test word format. In order reliably to detect double execution of functions or the skipping of a function, the number of activations of the function is additionally incorporated into the test word calculation.

The method to be used for check sum calculation is, for example, as mentioned, the multiple input signature register (MISR) method. A standardized polynomial, for example CRC-32, may also be used as the selected generator polynomial. It may in general be possible to use those generator polynomials or methods which ensure that they generate an incorrect check sum in the event of a fault. This criterion is met for the proposed check sum method and proposed generator polynomial, and for the aforementioned test word format.

Figure 5A:
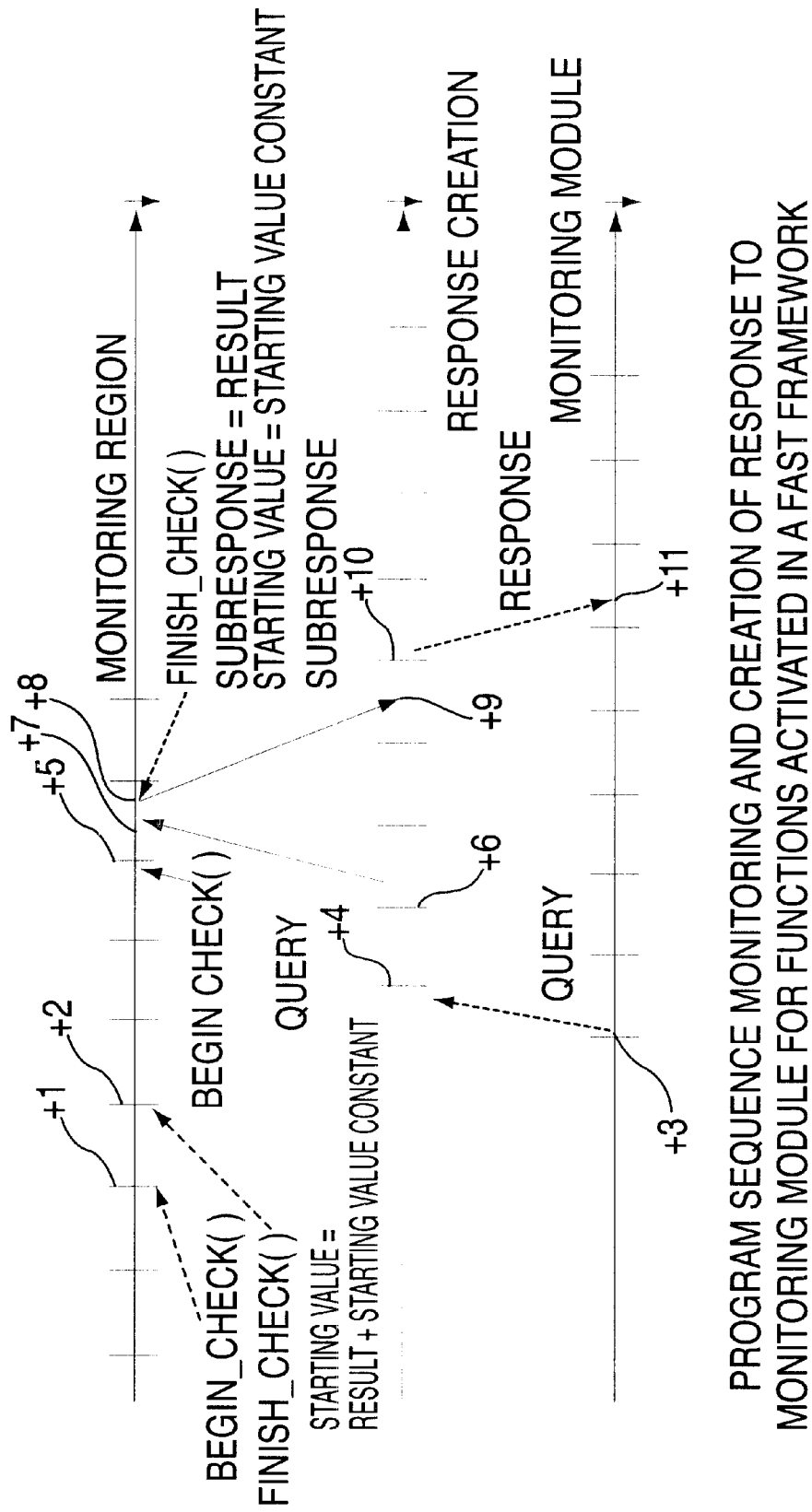
FIG. 5a shows the program sequence monitor or program sequence monitoring system and creation of the response to the monitoring module, for functions that are activated in a fast framework.
Figure 5B:
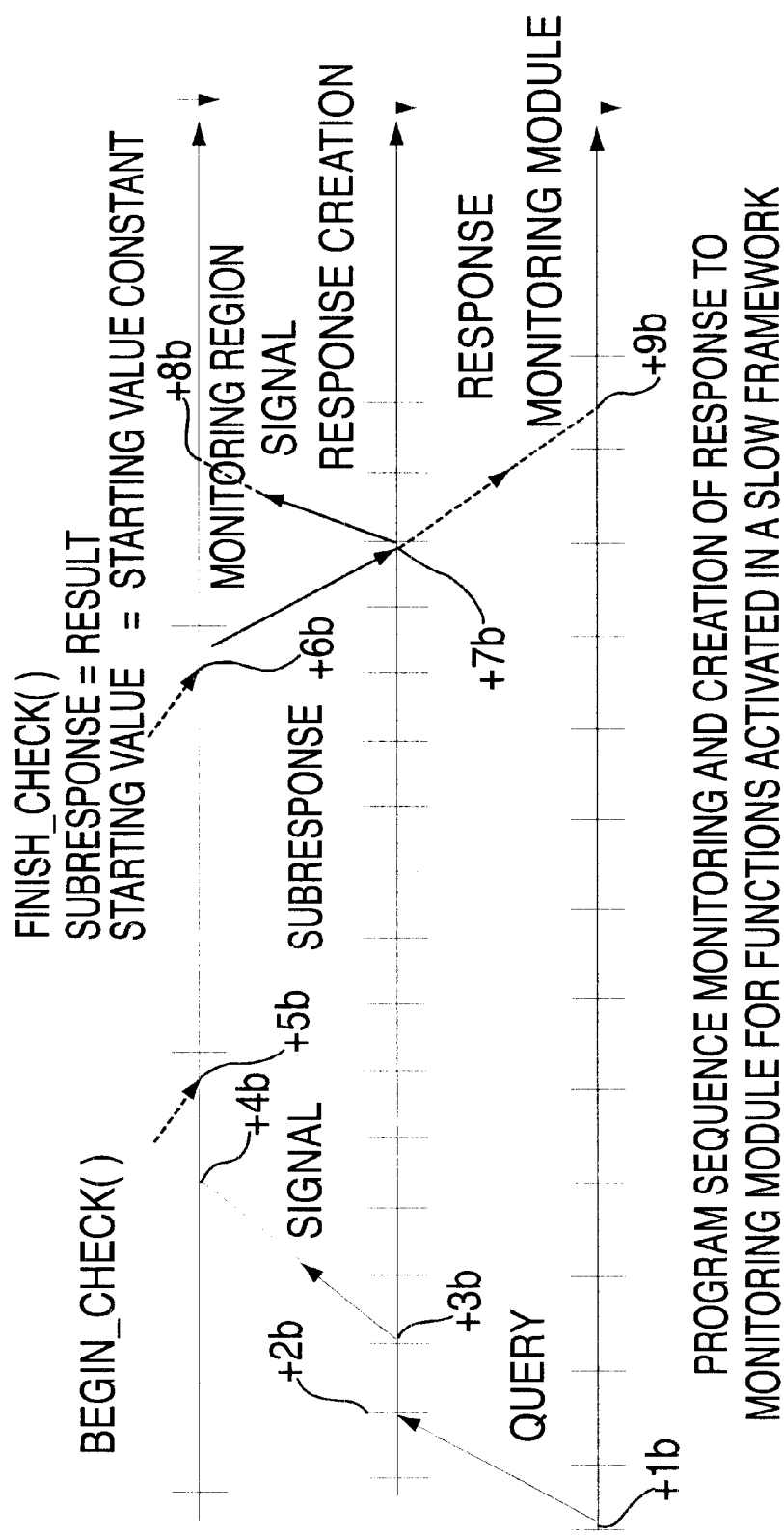
FIG. 5b shows the program sequence monitor or program sequence monitoring system and creation of the response to the monitoring module, for functions that are activated in a slow framework.

In FIG. 5, composed of FIGS. 5a and 5b, the monitoring process is once again depicted on the basis of the fast or slow framework, with reference to at least one monitoring region.

The following method may ensure continuous monitoring of a fast framework, as shown in FIG. 5a. If no new test datum or query from the monitoring module is present when execution of a monitoring region ends, the result is created on the basis of a correction value for the check sum calculation. The result is used as the starting value at the next activation of the monitoring region. If a new test datum is present when execution of a monitoring region ends, the result is created on the basis of the test datum. A constant is used as the starting value at the next activation. This correlation is depicted in FIG. 5a. If a fault, e.g. a transient hardware fault, occurs in an activation without a test datum (without a query), the fault will result in creation of an incorrect check sum and starting value for the next activation, until, because of the fault, an incorrect subresponse is created because of the incorrect starting value. The incorrect subresponse results in an incorrect response to the monitoring module, and the fault state is thus looped through.

For monitoring functions activated in the slow time framework, with this monitoring system there may be no direct dependence on the test datum or query, since the response to the monitoring module may need to be given prior to termination of the execution of the monitoring region. With a constant starting value and the aforementioned remainder, a check sum that is constant in the fault-free state (e.g. 0x0) is therefore calculated. The result is added to the starting value for the next activation, if a subresponse is not requested by the response creation function. Otherwise the result (which is constant if operation is fault-free) is returned as the subresponse. The subresponse most recently created by the program sequence monitoring system is used at each response creation, until a new subresponse has been calculated. Fixed fault latency times may thus be guaranteed. This is depicted in FIG. 5b. With sporadically executed functions, as stated above, the procedure described in conjunction with FIG. 5b is used on the basis of the upper time limit of sporadic function calls, i.e. for the case in which the upper time limit is less than or equal to the time period for response creation. For the other case, i.e. the upper time limit is greater than the time period for response creation, the method described in conjunction with FIG. 5a is used.

Continuous monitoring, in the context of an asynchronous relationship between the monitoring framework and response creation with defined fault latency times, may thus be possible.

What is claimed is:

1. A method for monitoring a control of operational sequences in a vehicle, comprising:

executing context control functions in a control unit;

executing monitoring functions that monitor the control functions, including:

transferring at least one query from a monitoring module to the control unit;

performing a first monitoring function in the control unit by calculating a subresponse to the query in a second definable timing framework;

creating a response to the monitoring module in the control unit from at least one subresponse, the creation of the response being activated in a first definable timing framework;

transferring the response from the control unit to the monitoring module; and detecting faults, via the monitoring module, regarding execution of the control functions as a function of the response;

wherein the first and the second definable timing frameworks are asynchronous with one another.

2. The method according to claim 1, wherein the first monitoring function is a sequence monitor.

3. The method according to claim 1, wherein the query is transferred in the first definable timing framework.

4. The method according to claim 1, wherein the query is transferred in a third definable time framework.

5. The method according to claim 1, wherein the query is transferred in an event-controlled manner.

6. The method according to claim 1, wherein the control functions are executed in a first functional plane of the control unit and the monitoring functions are executed in a second and a third functional planes of the control unit, at least the first and the second functional planes being independent of one another as long as no faults are detected.

7. The method according to claim 1, further comprising:

creating at least one monitoring region from the control functions of the first functional plane, so that selectable functions which form a sequence that is constant with respect to a run time of the control of the operational sequences are combined in the at least one monitoring region.

8. The method according to claim 7, further comprising:

incorporating the at least one monitoring region into the sequence monitor; and performing an activation of the monitoring region synchronously with the sequence monitor and asynchronously with activation of response creation.

9. The method according to claim 6, wherein the response is created in the third functional plane from subresponses of the monitoring functions of the control unit.

10. The method according to claim 1, further comprising:

generating at least one test word in the sequence monitor, the at least one test word including a counter that represents a number of activations of at least one monitored control function and a parameter identifying the at least one monitored control function.

11. The method according to claim 10, further comprising:

performing a check sum calculation via a generator polynomial by adding one of a query and a constant to the at least one test word and employing a result as a subresponse for response creation, the constant being added if no query is present.

12. The method according to claim 11, wherein the constant is selected so that the result corresponds exactly to an initial value of the check sum calculation if a program sequence is not faulty.

13. The method according to claim 11, wherein if the program sequence is faulty, the result is different from an initial value of the check sum calculation using the constant.

14. The method according to claim 11, further comprising:

reusing the result again as an initial value for a next check sum calculation so that a faulty program sequence remains detectable as an incorrect result until an ultimate evaluation.

15. An apparatus for monitoring control of operating sequences in a vehicle, comprising:

a monitoring module including a first arrangement, a second arrangement and a fifth arrangement; and a control unit for executing control functions, including a third arrangement and a fourth arrangement;

wherein the first arrangement executes monitoring functions that monitor the control functions, the second arrangement transferring at least one query to the control unit, and the first arrangement being configured to execute a first monitoring function and to calculate a subresponse to the query in a second definable time framework;

wherein the third arrangement creates a response to the monitoring module from at least one subresponse, the third arrangement being configured to activate creation of the response in a first definable time framework that is asynchronous to the second definable time framework;

wherein the fourth arrangement transfers the response from the control unit to the monitoring module;

and wherein the fifth arrangement detects faults as a function of the response regarding execution of the control functions.

16. The apparatus of claim 15, wherein the first monitoring function includes a sequence monitor.

* * * * *